US010512259B2

(12) United States Patent
Walsh et al.

(10) Patent No.: US 10,512,259 B2
(45) Date of Patent: Dec. 24, 2019

(54) RETRACTING TUNNEL RODENT TRAP

(71) Applicant: OMS Investments, Inc., Los Angeles, CA (US)

(72) Inventors: James R. Walsh, Wauwatosa, WI (US); Daniel C. Johnson, Madison, WI (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 14/946,927

(22) Filed: Nov. 20, 2015

(65) Prior Publication Data

US 2016/0073625 A1    Mar. 17, 2016

Related U.S. Application Data

(62) Division of application No. 13/738,008, filed on Jan. 10, 2013, now Pat. No. 9,220,256.

(51) Int. Cl.
*A01M 23/36*    (2006.01)
*A01M 23/30*    (2006.01)

(52) U.S. Cl.
CPC ............ *A01M 23/36* (2013.01); *A01M 23/30* (2013.01)

(58) Field of Classification Search
CPC ...... A01M 23/06; A01M 23/08; A01M 23/16; A01M 23/24; A01M 23/36; A01M 23/30; A01M 27/00
USPC .......................................... 43/77–79, 82, 83
See application file for complete search history.

(56) References Cited

U.S. PATENT DOCUMENTS

| 4,769,942 | A | * | 9/1988 | Copenhaver, Sr. ....................... A01M 25/004 43/58 |
| 4,949,499 | A | * | 8/1990 | Lindros, Jr. ............ A01M 23/16 43/61 |
| 5,044,111 | A | * | 9/1991 | Lindros, Jr. ............ A01M 23/16 43/61 |
| 5,175,957 | A | * | 1/1993 | West ...................... A01M 23/16 43/61 |
| 7,506,471 | B2 | * | 3/2009 | Rodgers ................ A01M 23/16 43/58 |
| 7,607,254 | B1 | * | 10/2009 | Huang ................... A01M 23/16 43/58 |
| 7,886,479 | B2 | * | 2/2011 | Bruno .................... A01M 23/08 43/67 |

(Continued)

FOREIGN PATENT DOCUMENTS

WO    WO 2004030451 A2 *    4/2004    ............ A01M 23/18

*Primary Examiner* — Lisa L Tsang
(74) *Attorney, Agent, or Firm* — Ulmer & Berne LLP

(57) ABSTRACT

A rodent trap having a covered base defines an enclosed interior accessible through a sliding plastic tunnel defining a passageway for rodents into the interior. The tunnel has a projecting strike member, and is biased by an underlying spring to a retracted position. A trigger engaging member extends from the tunnel to be retained by a catch on a trigger mounted to the base. When a rodent passes through the tunnel into the base interior, it is directed by barriers towards a rodent attracting bait. To reach the bait, the rodent must press against a pivotably mounted trigger, thereby dislodging the trigger from the trigger engaging member which releases the tunnel to be driven by the spring to retract along parallel tracks to bring the strike plate forcibly against the rodent within the trap, usually killing it, and closing the trap.

15 Claims, 3 Drawing Sheets

(56) References Cited

U.S. PATENT DOCUMENTS

| | | | |
|---|---|---|---|
| 9,374,993 B2* | 6/2016 | Smith | A01M 23/36 |
| 2006/0185223 A1* | 8/2006 | Watson | A01M 23/18 43/85 |
| 2014/0230312 A1* | 8/2014 | Le Laidier | A01M 23/30 43/82 |

* cited by examiner

RETRACTING TUNNEL RODENT TRAP

CROSS REFERENCES TO RELATED APPLICATIONS

This application is a divisional of and claims priority to U.S. application Ser. No. 13/738,008, filed Jan. 10, 2013, entitled "Retracting Tunnel Rodent T rap." The disclosure of this priority application is incorporated herein by reference in its entirety.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent traps and more particularly to disposable mouse traps.

Mice within human habitations, particularly residences, present a perennial hazard to health and enjoyment of dwelling spaces. Many devices are known to capture and kill rodents. The conventional spring and bail kill trap can be very effective, but the exposed spring-loaded bail can be a hazard to pets and children. Moreover, consumers often prefer to avoid contact with the rodent once it has been killed, and for this purpose fully enclosed kill traps have been developed which freely admit rodents in a set configuration, but once triggered block off the trap entrance so that the dead rodent is not exposed, nor are the remains of the rodent able to extend from the trap. These traps provide a visual cue to their successful use, signaling the user to remove and dispose of the trap and its contents.

There is always a need for a rodent trap of this sort that, while effective, is also capable of being produced at low cost, and using automated procedures.

SUMMARY OF THE INVENTION

The rodent trap of this invention has a molded plastic base with a cover which defines an enclosed interior. The interior is accessible through a sliding plastic tunnel which offers a passageway with two entryways for rodents. The molded plastic tunnel has a projecting strike member, and is biased by an underlying spring to a retracted position. A trigger engaging member extends from the tunnel to be retained by the catch on a side-mounted trigger to hold the tunnel in an extended set configuration where a rodent may readily enter. When a rodent passes through the tunnel into the interior of the base, it is directed by barriers into a trigger compartment which presents a rodent attracting bait. To reach the bait, the rodent must press against a pivotably mounted trigger, thereby dislodging the trigger from the trigger engaging member which releases the tunnel to be driven by the spring to retract along parallel tracks to bring the strike plate forcibly against the rodent within the trap, usually killing it, and closing the trap, which is then presented for convenient disposal without exposing the dead rodent.

It is an object of the present invention to provide a mouse trap which effectively kills mice and thereafter screens the trap contents from view.

It is another object of the present invention to provide a rodent trap which is economically manufactured.

Further objects, features and advantages of the invention will be apparent from the following detailed description when taken in conjunction with the accompanying drawings.

DESCRIPTION OF THE PREFERRED EMBODIMENTS

Figure 1:
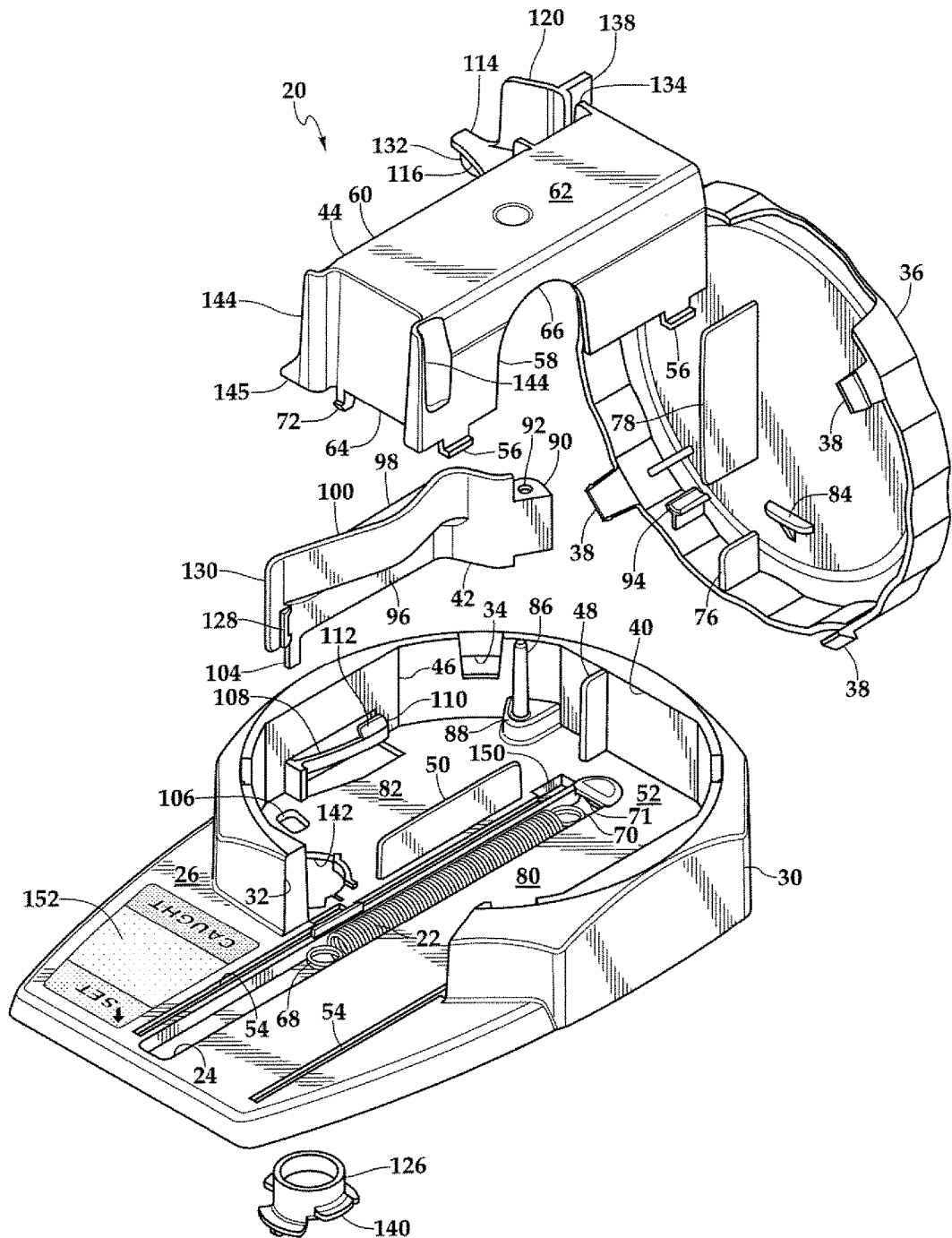
FIG. 1 is an exploded isometric view of the rodent trap of this invention.

Referring more particularly to FIGS. 1-4, wherein like numbers refer to similar parts, a rodent trap 20 is shown in FIG. 1. The rodent trap is economically assembled of six parts: a metal spring 22 and five molded plastic parts. The spring 22 is received within a recessed channel 24 formed in the projecting platform 26 of a plastic base 28. The base 28 has an upwardly protruding side wall 30. The side wall 30 has a front opening 32 and a number of barb-receiving ledges 34. A plastic lid 36 has protruding barbs 38 which engage with the barb-receiving ledges 34 to fix the lid to the base and to close off the trap 20 and define a trap interior 40.

Figure 2:
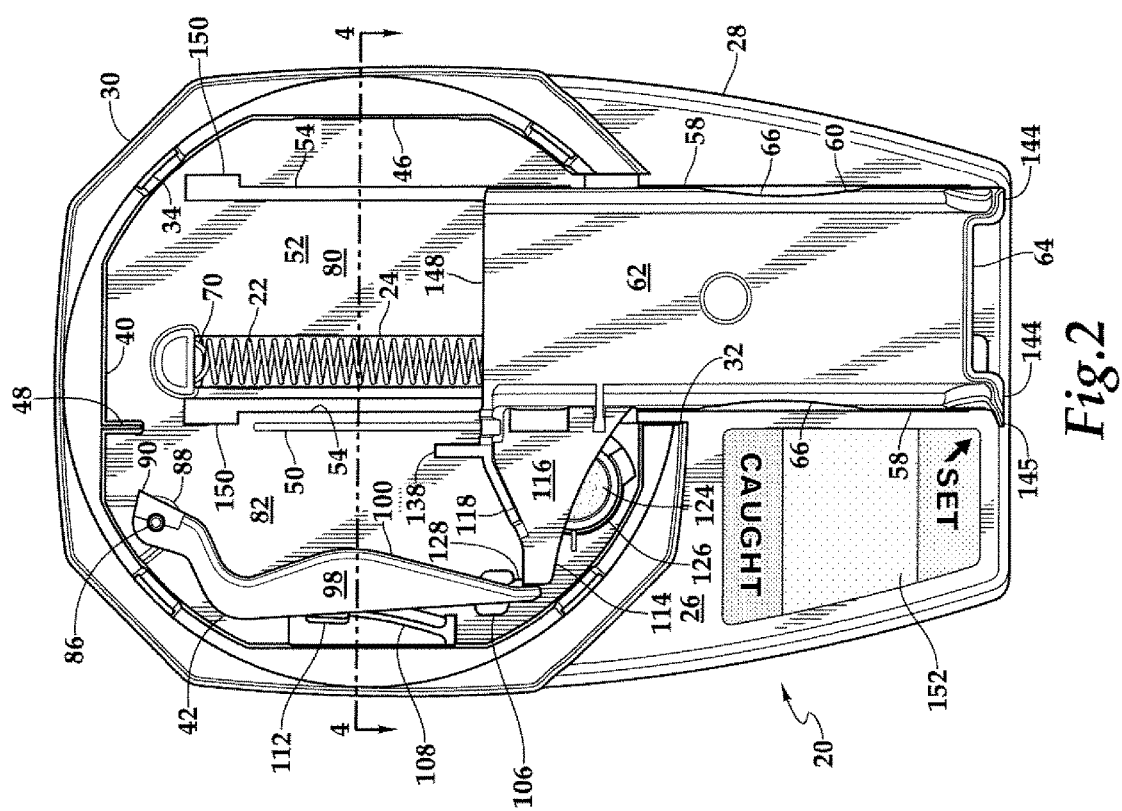
FIG. 2 is a top plan view, with the lid removed, of the rodent trap of FIG. 1 in a set configuration.

A trigger 42 is mounted within the base interior 40, and a slidable strike member 44 provides access to the base interior. As shown in FIG. 1, the base has an encircling interior wall 46 which extends around the interior. A stub wall 48 projects from the interior wall 46 rearwardly of the strike member 44, and is aligned with a lower barrier wall 50 which projects upwardly from the floor 52 of the base 28. Recessed beneath the floor 52 are two parallel guide tracks 54 which receive track-following flanges 56 which extend downwardly from the side walls 58 of a tunnel element 60 of the strike member 44. The tunnel element side walls 58 are joined to a tunnel top wall 62 and a tunnel end wall 64 to define an enclosed passageway which communicates with the trap interior 40. Each tunnel element side wall 58 has portions defining an arched opening or entryway 66, as shown in FIG. 2, which allows a rodent to enter from either side of the tunnel element. The tunnel element travels along the guide tracks under the urging of the spring when released from the trigger. The direction of tunnel element travel defines an axis, which is defined equidistant between the two side walls 58.

As shown in FIG. 1, the spring 22 has a forward loop 68 and a rear loop 70. The forward loop 68 is engaged by a hook 72 which extends downwardly from the end wall 64 of the tunnel element 60. The rear loop 70 of the spring 22 engages a spring hook 71 which protrudes downwardly from the base floor 52 adjacent the end of the spring channel 24. The spring 22 biases the strike member 44 into a retracted configuration, acting to accelerate the strike member towards a rodent within the trap 20 when the trigger 42 is tripped.

The lid 36 has a short stub wall 76 which extends downwardly close to the base stub wall 48, as well as an upper barrier wall 78 which extends near the base lower barrier wall 50. The lid and base stub walls 76, 48 and the lid and base barrier walls 78, 50, serve to define an entrance compartment 80 of the interior through which the tunnel element 60 extends, and a trigger compartment 82 within which is mounted the trigger 42.

A shallow tunnel stop 84 extends downward from the lid in a position rearward of the tunnel element 60. The tunnel stop 84 serves to limit the rearward travel of the strike member 44 by engaging the top wall 62 of the tunnel element as it moves rearwardly. As shown in FIG. 2, the trigger 42 is pivotably mounted to an upstanding pin 86 which, as best shown in FIG. 1, is supported on a platform 88 which extends from the base floor 52.

Figure 3:
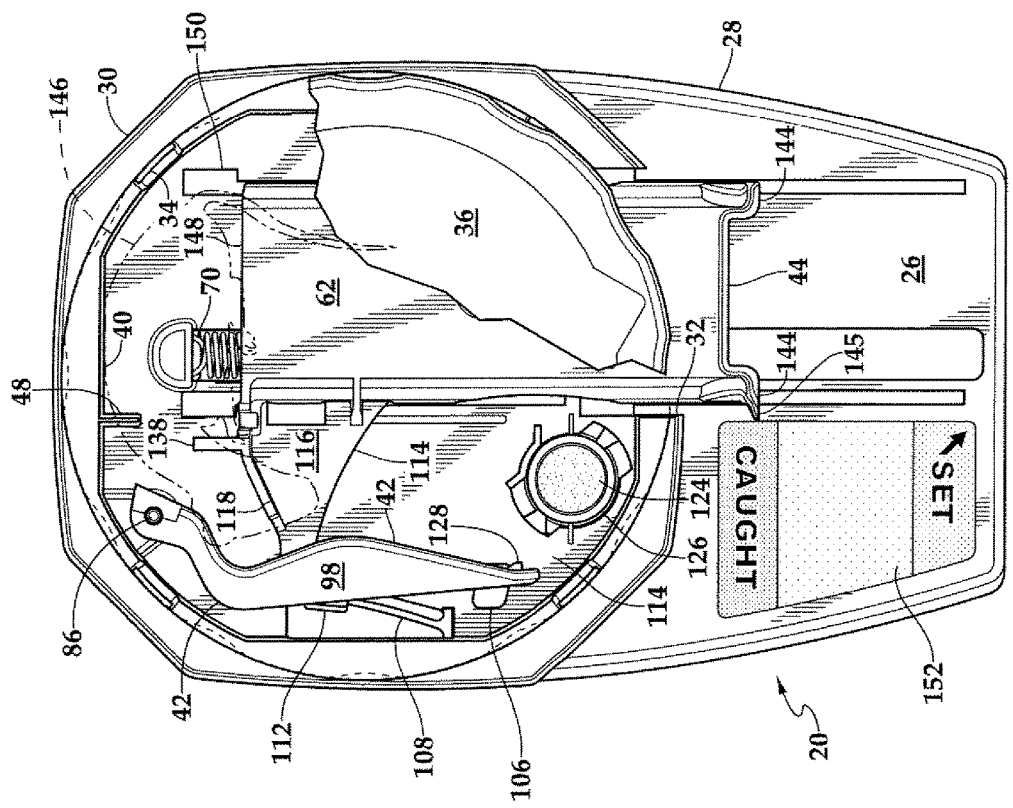
FIG. 3, is a top plan view, partially broken away in section, of the rodent trap of FIG. 1 in a triggered configuration.
Figure 4:
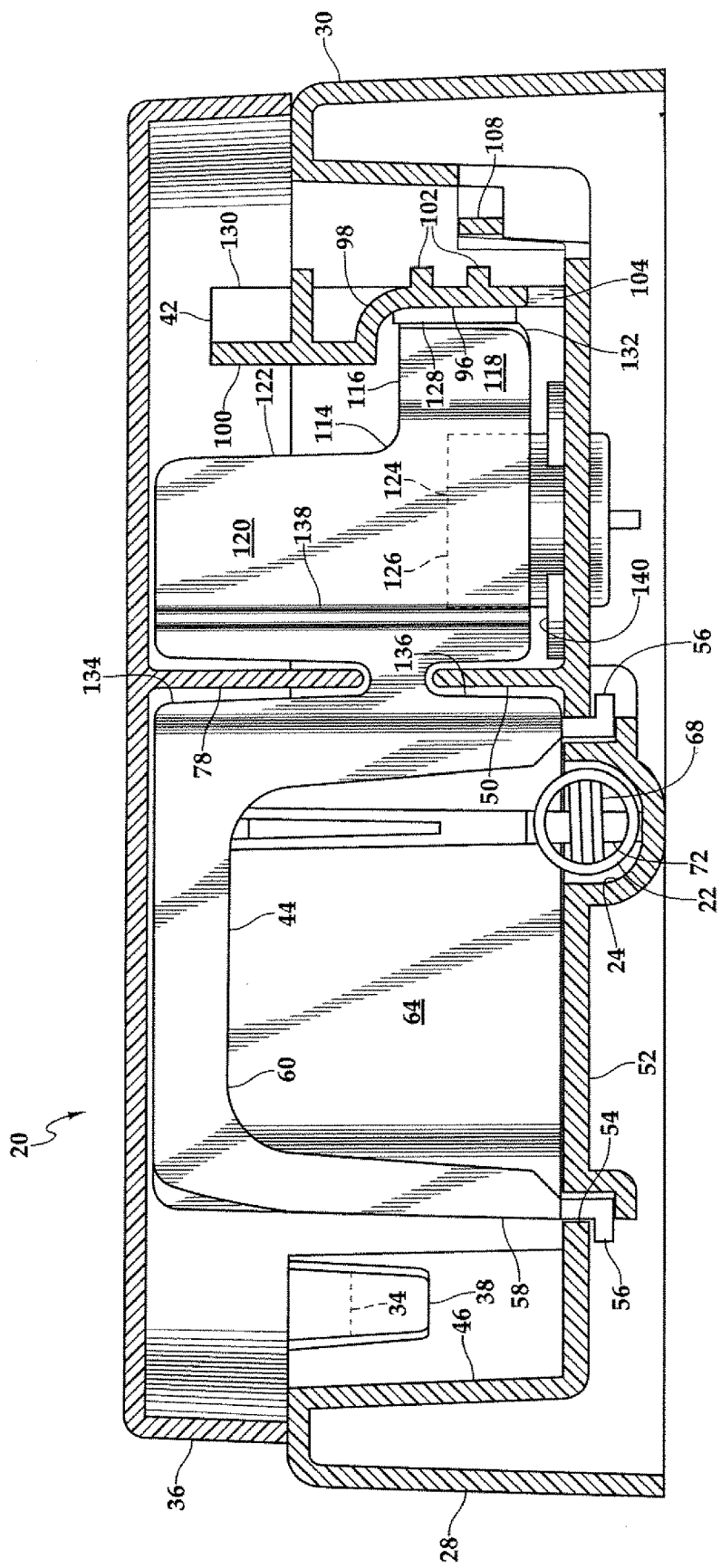
FIG. 4 is a cross-sectional view of the rodent trap of FIG. 2 taken along section line 4-4.

The trigger 42 is a molded plastic piece having two brackets 90 (only the top one being shown in FIGS. 1-3) with pin holes 92 through which the base pin 86 extends. The upper end of the pin 86 is supported against deflection in the direction of strike member movement by a protruding arc segment 94 which extends from the lid 36 adjacent the pin. The trigger 42 has a lower clearance wall 96 joined by a horizontal shelf 98 to a protruding upper wall 100, shown in FIGS. 1 and 2. The trigger 42 may be reinforced by outside ribs 102 running parallel to the shelf 98 as shown in FIG. 4. A tab 104 extends downwardly from the trigger clearance wall 96 near the end away from the brackets 90, and is received within a tab guide hole 106 formed in the floor 52 of the base 28. A spring 108 is integrally molded to protrude from the base interior wall 46 which has a free end 110, shown in FIG. 1, which engages the exterior of the trigger 42 and urges the trigger toward the strike member. The integral spring 108 may be formed with an upper lead-in ramp 112 to aid directing the trigger into place during assembly. The upper wall 100 of the trigger 42 extends into the trigger compartment 82 to narrow the compartment to increase the likelihood that a rodent passing through the compartment will engage the trigger.

As shown in FIG. 2, the strike member has a trigger engaging member 114 which projects from the strike member tunnel element 60 towards the trigger 42. The trigger engaging member 114 has a horizontal wall 116 which extends from the tunnel element 60 side wall 58 towards the trigger 42, and which joins a vertical wall 118. The vertical wall 118 extends downwardly along the entire inside edge of the horizontal wall 116, and extends upwardly to define a barrier wall 120. A clearance gap 122 is thus defined between the barrier wall 120 and the trigger upper wall 100. Through this gap 122 a rodent may detect the bait 124 contained within a removable bait cup 126, best shown in FIGS. 1 and 3. The bait cup 126 is positioned between the tunnel element 60 and the trigger 42. It is the bait which draws the rodent into the trigger compartment where it will not only activate the trigger, but also be best positioned for being struck in such a way as to be killed by portions of the strike member 44.

A catch 128 protrudes from the trigger lower wall 96 near the free end 130 of the trigger 42. The free end 132 of the vertical wall 118 of the trigger engaging member 114 abuts against the trigger catch 128, thereby holding the strike member 44 in its set position, with the tunnel element 60 extending from the trap interior 40 as shown in FIG. 2. In the set position, the strike member 44 is held against the force of the spring 22 which is urging the strike member towards its retracted configuration.

As best shown in FIG. 4, the trigger engaging member 114 is principally connected to the tunnel element 60 side wall 58 by the horizontal wall 116. An upper slot 134 and a lower slot 136 defined between the barrier wall 120 and the tunnel side wall 58 provide clearance for the upper barrier wall 78 and the lower barrier wall 50 as the strike member moves along the guide tracks 54. The lower clearance wall 96 of the trigger is recessed back from the trigger upper wall 100 to provide clearance for the trigger engaging member 114 as the strike member moves from its set configuration to a striking engagement with a captured rodent.

The strike member 44 has a vertical wall which acts as a strike plate 138 which extends in the direction of the strike member motion towards the rear of base 28. The strike plate 138 extends the full height of the barrier wall 120. As shown in FIG. 3, the strike plate 138 extends parallel to the rear barrier wall 48 but offset towards the trigger a small amount, for example about ⅛ inch. The strike plate 138 is an off-axis wall which extends towards the interior, and which is configured to strike portions of the rodent outside the tunnel element 60 when the trap 20 is triggered.

The operation of the trap 20 is illustrated in FIGS. 1 and 2. The user removes the bait cup 126 from the base 28 by rotating it to disengage the bait cup projecting flanges 140 from their engagement with the base floor 52 surrounding a bait cup opening 142 located within the trigger compartment 82. The user then places rodent bait 124, for example peanut butter, in the bait cup 126, and returns it to its position within the base 28. Because the bait cup 126 is removed and introduced through the underside of the base 28, the user need not remove the lid 36 from the trap. To set the trap, the user grips and pulls on the sidewardly projecting flanges 144 of the tunnel element 60 of the strike member 44 which are accessible exterior to the base 28. The tunnel element 60 is thus extended to reveal the two entryways 66 and the trigger engaging member 114 is brought forward until the integral spring 108 urges the trigger 42 to engage with the trigger engaging member, and thereby hold the strike member 44 in the set position as shown in FIG. 2.

One of the sidewardly projecting flanges 144 may have a protruding pointer 145, as shown in FIG. 1, which is always positioned outside the base interior and which extends over indicia 152 placed on the platform 26 of the base alongside one of the guide tracks 54. The indicia 152 may be molded into the base, or may be applied such as on an adhesive-backed label. The indicia include a region indicating that the trap is "set" as shown in FIG. 2, and another region, closer to the side wall 30 indicating that the trap has been activated and that a rodent has been "caught" as shown in FIG. 3. The words "set" and "caught" are spaced from each other in the axial direction of travel of the tunnel element 60, so that when the trap is in a position with the tunnel element extracted, the pointer 145 is near the indicium "set", and when the tunnel element is retracted substantially within the interior, the pointer is near the indicium "caught".

In the set position, the only access to the bait for a mouse 146 is through the entryways 66 and thence through a passageway 148 defined by the tunnel element 60, the lower barrier wall 50, the upper barrier wall 78, the lid 36 and the interior wall 46 on the entrance compartment 80 side of the base 28. When the mouse 146 enters the passageway 148, it must progress through the tunnel and then make a turn into the trigger compartment 82. As shown in FIG. 4, when the mouse looks into the trigger compartment the bait 124 is directly ahead, but shielded by the wall 118 of the trigger engaging member. The gap 122 presents a route to the bait 124. As the mouse moves towards the gap 122, it will engage against and displace sidewardly the upper wall 100 of the trigger 42, thereby causing the trigger to pivot about the pin 86 and releasing the trigger catch 128 from the free end of the 132 of the trigger engaging member 114 of the strike member 44. Once released from the trigger, the spring 22 accelerates the strike member along the axial path defined by the guide tracks 54 towards the rear of the base 28.

As shown in FIG. 3, this rapid retraction of the strike member brings the vertical wall 118 and the strike plate 138 into contact with the mouse 146 and forcibly displaces it towards the rear of the base. Because the mouse's head was within the trigger compartment when the trigger was engaged, it is likely that the strike plate 138 will crush the torso of the mouse 146 between the strike plate 138 and the wall 48 at the rear of the base, usually causing death. The tunnel element 60 may be a little more than 3 inches long. Because the mouse is partially within the trigger compartment when struck, there is adequate space within the trap to entirely contain the rodent's remains so that none will project beyond the trap interior. The retracted tunnel element 60 gives an easily perceived signal to the user that a mouse has been caught. The trap 20 and the mouse therein may then be disposed of by the user without the need to ever come directly in contact with the mouse remains.

It is understood that the invention is not limited to the particular construction and arrangement of parts herein illustrated and described, but embraces all such modified forms thereof as come within the scope of the following claims.

We claim:

1. A rodent trap comprising:
    a base having an interior wall which defines a base interior and having an opening which communicates with the base interior;
    a strike member comprising a tunnel element defining a passageway which passes through the interior wall opening to communicate with the base interior, the tunnel element extending through the opening in the interior wall, the tunnel element defining at least one entryway through which a rodent gains access to the passageway, the strike member being mounted to the base for linear travel between a first extended position and a second retracted position, the at least one entryway being exterior to the base interior when the strike member is in the first extended position;
    a biasing member arranged to bias the strike member toward the retracted position; and
    a trigger coupled to the rodent trap and having a trigger catch positioned outside the strike member when the strike member is in the first extended position and the second retracted position and arranged to hold the strike member in the first extended position, wherein a rodent moving through the passageway into the base interior and against the trigger will dislodge the trigger catch from the strike member to release the strike member to linearly travel to the second retracted position to strike the rodent between the strike member and the base, and wherein the trigger is coupled to the rodent trap when the strike member is in the second retracted position.

2. The rodent trap of claim 1 further comprising a trigger spring which biases the trigger towards the strike member.

3. The rodent trap of claim 1 wherein the base has a platform which projects beyond the base interior, wherein the biasing member comprises a spring, and wherein a channel in the base platform receives the spring, and wherein at least one guide track is formed in the base to receive a projection from the strike member to guide it along a desired path.

4. The rodent trap of claim 1 wherein the trigger extends in generally the same direction as the passageway and is spaced sidewardly therefrom.

5. The rodent trap of claim 1 wherein the strike member has a trigger engaging member which engages the trigger catch, and wherein an entrance compartment is defined within the base interior in communication with the passageway, and wherein a trigger compartment is alongside the entrance compartment and in communication therewith, wherein the trigger engaging member has a horizontal wall which projects from a side wall of the strike member, and a vertical wall which extends upwardly from the horizontal wall to face towards a rodent entering the trigger compartment from the entrance compartment.

6. The rodent trap of claim 5 wherein a strike plate extends from the trigger engaging member vertical wall and the strike plate is positioned to strike a rodent within the base interior when the trigger is triggered.

7. The rodent trap of claim 1 further comprising a bait cup positioned within the base interior between the trigger and the strike member.

8. The rodent trap of claim 1 further comprising a lid which is connected to the base to define the base interior, the lid having a barrier wall which extends downwardly into the base interior, and wherein the base has a barrier wall which extends upwardly into the base interior, the lid barrier wall and the base barrier wall extending between an entrance compartment and a trigger compartment, the trigger being pivotably mounted to the base.

9. The rodent trap of claim 1 further comprising:
    indicia associated with the base to indicate whether the trap is set or has been activated, the indicia being spaced from one another; and
    indicator portions of the strike member which extend outside the base interior and which point to one of the spaced indicia depending on whether the strike member is in the first extended position or the second retracted position.

10. The rodent trap of claim 1,
    wherein the base has at least one guide track which extends outside the base interior;
    wherein the tunnel element is mounted to the base, the tunnel element further comprising portions which extend into the at least one base guide track, wherein the tunnel element is mounted for travel on the base between the first extended position in which the at least one entryway is accessible by a rodent exterior to the base interior, and the second retracted position;
    wherein the biasing member comprises a spring extending between the base and the tunnel element;
    wherein the spring biases the tunnel element towards the second retracted position; and
    wherein the tunnel element is configured to travel, guided by the at least one guide track, to the second retracted position under the urging of the spring, such that the tunnel element will strike portions of the rodent upon release of the strike member by dislodgement of the trigger catch by the rodent.

11. The rodent trap of claim 10 wherein the base has a platform which projects beyond the interior wall, and wherein the at least one guide track is formed on the base platform.

12. The rodent trap of claim 1 wherein the trigger is positioned outside the strike member when the strike member is in the first extended position and the second retracted position.

13. The rodent trap of claim 1 wherein the rodent moving through the passageway into the base interior and against the trigger will dislodge the trigger catch from an outer surface of the strike member to release the strike member to linearly travel to the second retracted position.

14. The rodent trap of claim 1 wherein the trigger does not contact the strike member when the strike member is in the second retracted position.

15. The rodent trap of claim 1 wherein the strike member has a trigger engaging member that projects from the strike member tunnel element, the trigger engaging member engaging the trigger catch when the strike member is in the first extended position.

* * * * *